United States Patent
Terrier et al.

(10) Patent No.: US 9,991,840 B2
(45) Date of Patent: Jun. 5, 2018

(54) METHOD AND UNIT FOR CONTROLLING AND/OR PROTECTING AN ACTUATOR OF A PIECE OF MOBILE EQUIPMENT OF A BUILDING

(71) Applicant: SOMFY SAS, Cluses (FR)

(72) Inventors: Nicolas Terrier, Ayse (FR); David Mugnier, Mont-Saxonnex (FR)

(73) Assignee: SOMFY SAS, Cluses (FR)

( * ) Notice: Subject to any disclaimer, the term of this patent is extended or adjusted under 35 U.S.C. 154(b) by 0 days. days.

(21) Appl. No.: 15/328,894

(22) PCT Filed: Jul. 17, 2015

(86) PCT No.: PCT/FR2015/051969
§ 371 (c)(1),
(2) Date: Jan. 24, 2017

(87) PCT Pub. No.: WO2016/012702
PCT Pub. Date: Jan. 28, 2016

(65) Prior Publication Data
US 2017/0222593 A1    Aug. 3, 2017

(30) Foreign Application Priority Data

Jul. 25, 2014  (FR) ...................................... 14 57176

(51) Int. Cl.
H02P 1/04       (2006.01)
H02P 29/024     (2016.01)

(52) U.S. Cl.
CPC .................................. H02P 29/027 (2013.01)

(58) Field of Classification Search
CPC ...... H02P 2006/045; H02P 27/08; H02P 6/28; H02P 29/024; H02P 21/22; H02P 29/0241; H02P 29/028; H02P 29/662
(Continued)

(56) References Cited

U.S. PATENT DOCUMENTS

| 5,644,205 A * | 7/1997 | Nguyen Phuoc ....... H02P 21/18 318/400.23 |
| 7,498,784 B2 * | 3/2009 | Gokita ................. G01R 19/003 323/282 |

(Continued)

FOREIGN PATENT DOCUMENTS

JP    2007052797 A    3/2007

OTHER PUBLICATIONS

International Search Report dated Sep. 29, 2015 re: Application No. PCT/FR2015/051969; pp. 1-2; citing: JP 2007 052797 A and US 2012/265457 A1.

*Primary Examiner* — Bentsu Ro
*Assistant Examiner* — Thai Dinh
(74) *Attorney, Agent, or Firm* — Cantor Colburn LLP

(57) ABSTRACT

A method for controlling and/or protecting an actuator of a piece of mobile equipment of a building, the actuator comprising a motor, comprises the steps consisting of: (E1) providing an instantaneous signal representative of the electrical power provided to the motor, (E2) carrying out a sampling of values of the instantaneous signal, (E3) performing a control of each sampled value according to a first protection criterion of the actuator, and issuing a first piece of anomaly information for each sampled value that does not satisfy the first criterion, (E3') acquiring a set of values from the sampled values, (E4') performing a control according to a second protection criterion of the actuator applied to all of the acquired sampled values, and issuing a second piece of anomaly information for all of the acquired sampled values that do not satisfy the second protection criterion.

13 Claims, 8 Drawing Sheets

(58) Field of Classification Search
USPC ......... 318/400.01, 400.04, 400.09, 434, 479, 318/503, 504
See application file for complete search history.

(56) References Cited

U.S. PATENT DOCUMENTS

| | | | |
|---|---|---|---|
| 7,894,216 B2* | 2/2011 | Melanson | H02M 1/4225 |
| | | | 323/222 |
| 8,129,936 B2* | 3/2012 | Becker | H02P 21/30 |
| | | | 318/767 |
| 8,450,957 B2* | 5/2013 | Ding | H02P 27/12 |
| | | | 318/400.02 |
| 2012/0265457 A1 | 10/2012 | Donolo | |

* cited by examiner

METHOD AND UNIT FOR CONTROLLING AND/OR PROTECTING AN ACTUATOR OF A PIECE OF MOBILE EQUIPMENT OF A BUILDING

TECHNICAL FIELD

The present invention concerns a method and a unit for controlling and/or protecting an actuator of a mobile equipment of a building, the actuator comprising a motor of the type comprising a rotor and a stator.

BACKGROUND

The present invention can for example be implemented for an actuator comprising an electronically commutated brushless direct-current motor (or also called <<BLDC>>, acronym for BrushLess Direct Current). A motor of this type comprises a rotor provided with permanent magnets and a stator provided with several windings.

The motor further comprises a control system arranged to successively supply the windings with electrical energy. For the motor to operate, the electromagnetic field generated by the successive supply to the windings should be synchronized to the position of the rotor.

To this end, the control system comprises position sensors arranged to determine the position of the rotor.

This type of motor can be regulated according to its rotational speed. It is thus possible to limit the speed such that the rotational speed does not exceed the maximum speed permissible by the mechanical members of the actuator.

This type of motor can also be regulated according to its torque. It is thus possible to limit the torque such that the torque does not exceed the maximum torque permissible by the mechanical members of the actuator.

This system is satisfactory when all the members of the motor operate properly. However, the actuator, and in particular the motor, needs to be protected since there is, in particular, always a risk that the current applied to the motor demagnetizes the permanent magnets, that a short circuit is formed, in particular during the supply change to the windings, or that the torque applied to the motor abnormally increases.

BRIEF SUMMARY

The present invention aims to resolve all or part of the abovementioned drawbacks.

To this end, the present invention concerns a method for controlling and/or protecting an actuator of a mobile equipment of a building, the actuator comprising a motor of the type comprising a rotor and a stator, the method comprising:
  having an instantaneous signal representative of the power supply provided to the motor, the instantaneous signal having a plurality of pulses,
  carrying out a sampling of values of the instantaneous signal, the sampling being synchronized with at least one portion of the pulses of the plurality of pulses of the instantaneous signal,
  carrying out a control of each sampled value according to a first protection criterion of the actuator, and emitting a first anomaly piece of information for each sampled value not complying with the first protection criterion,
  acquiring a set of values among the sampled values,
  carrying out a control according to a second protection criterion of the actuator applied to the set of acquired sampled values, and emitting a second anomaly piece of information for the set of acquired sampled values not complying with the second protection criterion.

The protection criteria can be applied not only to the motor but also to all or part of the set of components constituting the actuator. It is, of course, the motor, but also the electronics for driving the motor and the mechanical members for connecting the actuator to the mobile equipment.

The control carried out on each sampled value according to the first protection criterion is a systematic control. Thus, each pulse is measured and each pulse value which is not in accordance with the first protection criterion is detected.

On the contrary, the set of acquired sampled values is subjected to a control according to the second protection criterion in order to detect an anomaly reflected in a lasting variation which may not lead to a violation of the first protection criterion.

Thus, it appears that these two types of controls according to two different protection criteria allow an optimum protection of the motor.

Indeed, the instantaneous signal representative of the power supply provided to the motor is the image of the torque provided by the motor.

A multitude of operating anomalies can thus be detected so as to protect, in particular, the motor of a current having a too significant value which can cause, for example, a demagnetization of magnets in the case of a motor of the type electronically commutated brushless direct-current, or torque greater than the maximum torque permissible by the motor.

According to an aspect of the invention, the rotor or the stator of the motor comprises a plurality of windings successively powered in a variable manner in order to generate a rotational movement of the rotor, according to control sequences. The control sequences correspond to successive supply configurations separated by transitions or control changes.

For example, switches can be interposed between the power supply to the motor and the windings so as to vary the supply in the windings according to the supply configurations.

Preferably, a sampled value is acquired between two control changes.

In particular, the acquired sampled value corresponds to a last pulse of the instantaneous signal between two control changes. This arrangement allows systematically determining the sampled value to be acquired without having to carry out a specific step comprising determining what will be the value to be acquired from the sampled values between two control changes.

According to an aspect of the invention, the motor has at least one first operating mode, in particular a starting mode of the motor, and a second operating mode, in particular a stabilized operating mode, and in which the first protection criterion and/or the second protection criterion of the actuator is modified according to the operating mode of the motor.

This arrangement allows adapting the protection, that is to say the triggering of the safe shutdown of the motor, according to the operating mode.

According to an aspect of the invention, a representative magnitude from said set of acquired sampled values is determined, and the second protection criterion of the actuator is applied to said representative magnitude.

The representative magnitude is not necessarily determined from each sampled value, but only from the set of acquired sampled values. Thus, the determination of the representative magnitude does not require a significant computational effort.

According to an aspect of the invention, the stator of the motor comprises a plurality of windings successively subjected to the power supply provided to the motor.

Preferably, the set of acquired sampled values corresponds to a sampling synchronized with each last pulse before the change of the powered winding.

According to an aspect of the invention, during the step of acquiring and determining the representative magnitude, an acquired sampled value subsequently to the acquired sampled values is added to the set of acquired sampled values, the representative magnitude being determined again following the addition of the subsequently acquired sampled value.

This arrangement allows continuously updating the representative magnitude. Thus, it is a representative magnitude variable depending on the evolution of the operation of the motor and not a discrete representative magnitude.

According to an aspect of the invention, during the addition of the subsequently acquired sampled value, the oldest acquired sampled value is deleted from the set of acquired sampled values.

Preferably, the representative magnitude is a running average of the acquired sampled values.

This arrangement allows determining a representative magnitude corresponding to the evolution of the operation of the motor. The representative magnitude is thus not disturbed by too old acquired sampled values.

According to an aspect of the invention, the control according to the second protection criterion of the actuator further comprises a comparison of a time evolution of the successively determined representative magnitudes with a time evolution threshold.

By way of example, the time evolution threshold corresponds to a variation threshold of the representative magnitude over a given period of time.

Non-compliance with the second protection criterion of the actuator may in particular correspond to exceeding the time evolution threshold by the time evolution of the representative magnitudes.

Preferably, the second anomaly piece of information emitted following an exceeding of the time evolution threshold comprises an indication signaling the exceeding of the time evolution threshold.

Thus, a too rapid evolution of the representative magnitude, being generated indirectly by the power supply provided to the motor, is detected by a control according to the second protection criterion.

This arrangement allows detecting a sharp increase or decrease of the instantaneous signal representative of the power supply provided to the motor even though the first protection criterion of the actuator is always respected.

According to an aspect of the invention, the control according to the first protection criterion of the actuator comprises a comparison of each sampled value with a first threshold value.

Preferably, the first anomaly piece of information is emitted when the sampled value is greater than the first threshold value.

Preferably, the first threshold value is defined as corresponding to the lowest of the values related to the instantaneous signal representative of the power supply provided to the motor beyond which an anomaly appears.

According to an aspect of the invention, the control according to the second protection criterion of the actuator comprises a comparison of the representative magnitude with a second threshold value.

Preferably, the second anomaly piece of information is emitted when the representative magnitude is greater than the second threshold value.

In particular, when a second anomaly piece of information is emitted for a representative magnitude greater than the second threshold value, the second anomaly piece of information comprises an indication signaling the crossing of the second threshold value.

Thus, it appears that the second threshold value may be exceeded, even if the first protection criterion of the actuator is respected.

Furthermore, in case the protection criteria of the actuator are modified according to the operating mode of the motor, this modification may be for example carried out by modifying the value of the first threshold and/or the second threshold.

According to an aspect of the invention, the first threshold value is modified according to the operating mode of the motor, in particular the starting mode of the motor or the stabilized operating mode of the motor.

This arrangement allows adapting the first threshold value to the operating mode of the motor. Indeed, the threshold values not to be exceeded for the signal representative of the power supply to the motor are not constant according to the operating modes of the motor.

According to an aspect of the invention, the first threshold value is defined relative to a limit intensity when the motor switches from a zero rotational speed to a determined rotational speed. This corresponds to the starting mode of the motor.

Preferably, said limit intensity corresponds to a maximum value of the current permissible by the actuator in operation.

According to an aspect of the invention, the first threshold value is defined relative to a limit intensity when the motor has reached at least once the rotational speed determined after starting.

Preferably, said limit intensity corresponds to a maximum permissible value of the current, after passing in the motor, not to be exceeded so that the torque of the motor is below an operating limit value.

According to an aspect of the invention, the second threshold value is modified according to an operating mode of the motor, in particular the starting mode of the motor or the stabilized operating mode of the motor.

This arrangement allows adapting the second threshold value to the operating mode of the motor. Indeed, the threshold values not to be exceeded for the instantaneous signal representative of the power supply to the motor are not constant according to the operating modes of the motor.

According to an aspect of the invention, the second threshold value is defined as equal to a limit intensity.

Preferably, said limit intensity corresponds to a limit operating average intensity beyond which the torque of the motor is greater than the maximum torque permissible by the mechanical members of the actuator.

According to an aspect of the invention, the second threshold value is defined as equal to a stabilized operating limit intensity when the motor has been operating for a defined period of time following the start of the regulation of the rotational speed.

The present invention also concerns a computer program product comprising code instructions arranged to implement the steps of a control and/or protection method as described above.

The present invention further concerns a control and/or protection unit provided with a processor comprising in memory the code instructions of a computer program product as described above, the control and/or protection unit being arranged to read an instantaneous signal representative of the power supply provided to a motor of the type comprising a rotor and a stator.

According to an aspect of the invention, the instantaneous signal representative of the power supply provided to the motor is an electrical current or voltage image of the torque provided by the motor.

According to an aspect of the invention, the control and/or protection unit further comprising a signal generator arranged to deliver an instantaneous signal representative of the power supply provided to the motor, and a biasing member arranged to establish a default input signal instead of the instantaneous signal when the signal generator has a defect generating the absence of signal.

The biasing member serves to bias the analog-to-digital converter input in some events of default, in particular the breaking of an electronic component.

If, in case of abnormal operation, the instantaneous signal representative of the power supply provided to the motor cannot be read by the control unit, the default input signal is detected.

This arrangement prevents the reading of a random signal when an incident causes the interruption in the instantaneous signal representative of the power supply provided to the motor.

Indeed, the reading of a random signal will not necessarily generate the detection of an anomaly by applying the first protection criterion and the second protection criterion of the actuator. On the contrary, the default input signal, when read by the control and/or protection unit, is well detected as being an anomaly.

According to an aspect of the invention, the control and/or protection unit comprises a digital processing unit, for example a microcontroller, the digital processing unit comprising the processor and an analog-to-digital converter arranged to read and convert the instantaneous signal representative of the power supply provided to the motor into a digital signal interpretable by the processor.

According to an aspect of the invention, the processor is arranged to automatically carry out a control according to the first protection criterion of the actuator from the interpretable digital signal.

Preferably, the processor is arranged to acquire a set of values among the sampled values and to determine a magnitude representative of said set of acquired sampled values.

In particular, the sampled values not acquired for the determination of the representative value are not stored in the memory of the processor. This arrangement aims to limit the use of the resources of the processor.

Independently to the method described above, the present invention concerns a control and/or protection unit comprising:
 a digital processing unit arranged to read an instantaneous signal representative of the power supply provided to a motor of the type comprising a rotor and a stator,
 a signal generator arranged to deliver an instantaneous signal representative of the power supply provided to the motor, and
 a biasing member arranged to establish a default input signal instead of the instantaneous signal when the signal generator does not transmit an instantaneous signal.

Preferably, the biasing member is powered by the supply voltage of the digital processing unit. In particular, the biasing member comprises a resistor.

According to an aspect of the invention, the signal generator is arranged to carry out an analog filtering of an outgoing intensity of the motor and to obtain an instantaneous signal representative of the power supply provided to the motor. Preferably, the analog filtering is of the RC type.

The present invention further concerns an actuator of a mobile equipment of a building comprising:
 a motor of the type comprising a rotor and a stator,
 a power module arranged to provide a power supply to the motor,
 a control and/or protection unit as previously described, arranged to read an instantaneous signal representative of the power supply provided to the motor.

BRIEF DESCRIPTION OF THE DRAWINGS

In any case, the invention will be well understood using the following description with reference to the appended schematic drawings representing, by way of non-limiting example, an embodiment of this method and of this control and/or protection unit.

DETAILED DESCRIPTION

Figure 1:
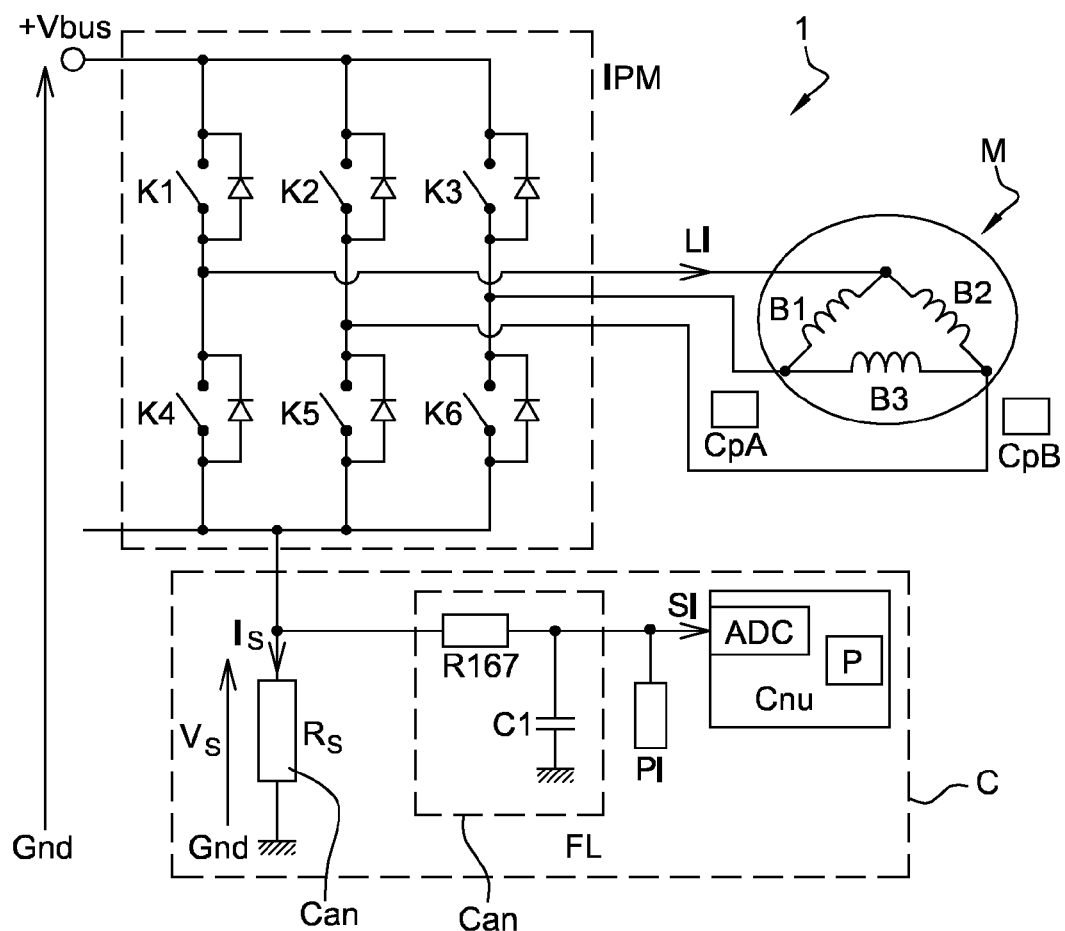
FIG. 1 is an electric diagram of an actuator comprising a motor, a power module and a control and/or protection unit in accordance with an embodiment of the invention.

As illustrated in FIG. 1, an actuator 1 of a mobile equipment of a building, such as a roller shutter or an awning or a blind with adjustable slats or else a rolling gate, comprises a power module IPM connected to a direct voltage source +Vbus. The value of +Vbus is defined relative to the ground, or in other words to a reference voltage, Gnd.

Of course, the present invention applies to all types of concealing device.

The actuator 1 further comprises a motor M of the type comprising a rotor and a stator. The motor M is of the electronically commutated brushless direct current type (also called BLDC, BrushLess Direct Current).

The stator of the motor M comprises three windings B1, B2, B3 sequentially powered by the power module IPM, which generates a rotating electromagnetic field. The rotor, not represented, comprises permanent magnets oriented in the direction of the electromagnetic field.

The motor M is further provided with a first sensor Cp A and with a second sensor Cp B arranged to determine the position of the rotor.

Of course, the number of sensors of the motor allowing determining the position of the rotor is in no way restrictive, and in particular may be of three. In another embodiment, the motor may also be devoid of sensors for determining the position of the rotor.

Thus, the detection may be implemented by other measuring means, for example, by determining the electromotive force of the motor M.

For the motor to operate, the successive supply to the windings B1, B2, B3 should be controlled synchronously with the position of the rotor.

The driving is preferably carried out in phase, but may also be carried out in advance or late, so as to create a motor torque.

For the successive supply to the windings B1, B2, B3, the power module IPM is provided with the switches K1, K2, K3, K4, K5, K6, for example of the MOSFET (Metal Oxide Semiconductor Field Effect Transistor) type.

Herein and without limitation, the power module IPM comprises the six switches K1, K2, K3, K4, K5, K6 of the MOSFET type in the same component.

Of course, the arrangement of the switches of the power module may be different, and in particular these may be independent, or else disposed according to a configuration comprising three arms of two switches.

Furthermore, the switches of the power module may be in particular of the IGBT (Insulated Gate Bipolar Transistor) type.

The actuator 1 comprises a control and/or protection unit C provided with a digital processing unit Cnu. The digital processing unit Cnu is provided with a processor P comprising a system for regulating the rotational speed of the motor M.

To this end, the processor P is arranged to drive the opening and the closing of the switches K1, K2, K3, K4, K5, K6 so as to successively supply electrical energy to each winding B1, B2, B3 of the stator. Two of the switches K1, K2, K3, K4, K5, K6 are alternately driven as described in FIGS. 2 and 3. The driving of two of the switches K1, K2, K3, K4, K5, K6 corresponds to a control sequence, the change of two of the driven switches K1, K2, K3, K4, K5, K6 being called control change.

Thus, the control sequences are separated by control changes which correspond to transitions between a first sequence during which a first couple of the switches K1, K2, K3, K4, K5, K6 is used and a second sequence during which a second couple of the switches K1, K2, K3, K4, K5, K6 is used.

Figure 3:
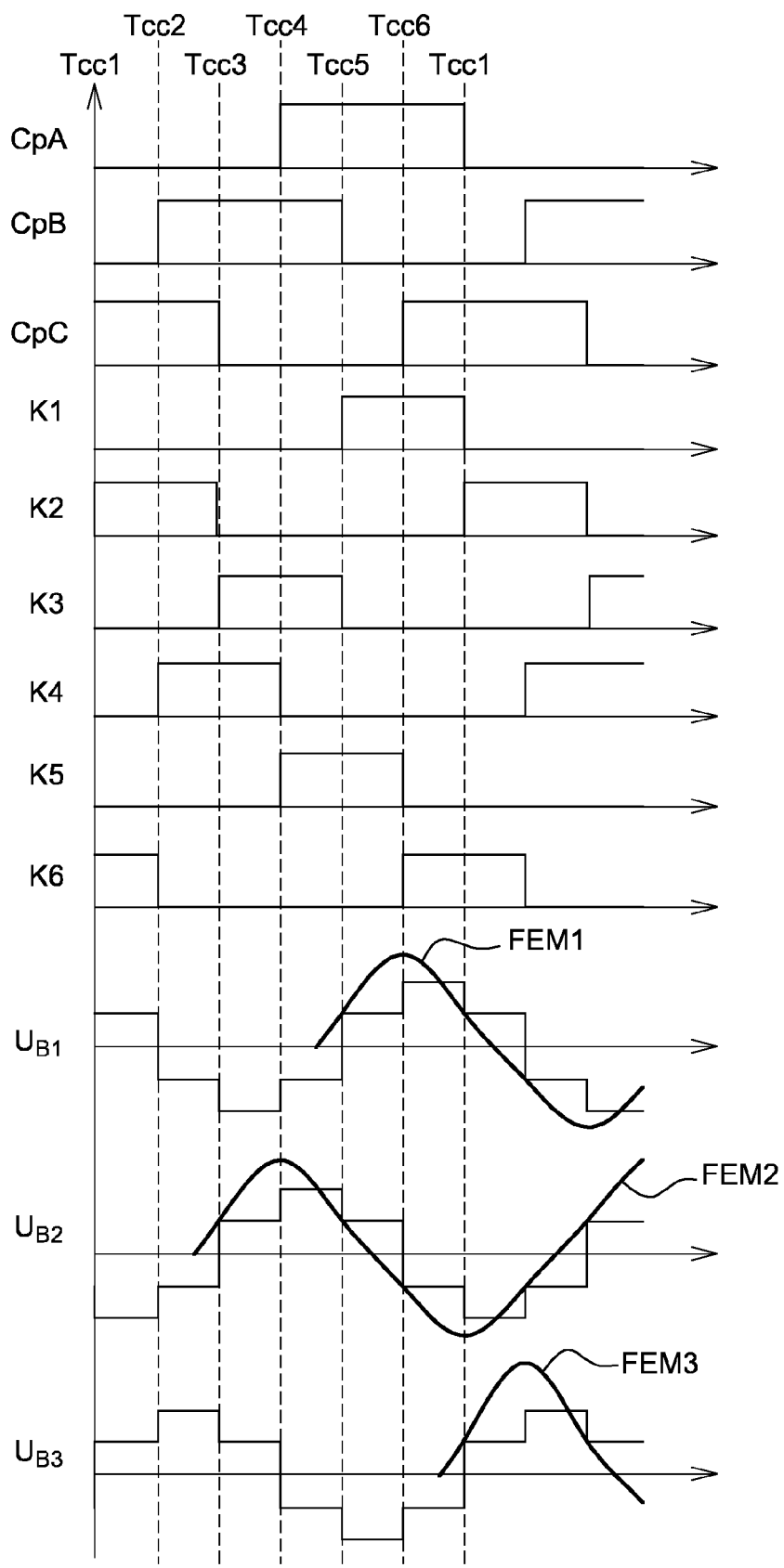
FIG. 3 is a diagram showing switches with regard to the state of supply to the windings of the actuator of FIG. 1.

In FIG. 3, the control sequences of two physical sensors Cp A, Cp B are represented. Furthermore, the control sequence of a third sensor Cp C is represented. This third sensor Cp C is a virtual sensor whose signal is determined from the signals of the two physical sensors Cp A and Cp B. According to a variant, a third physical sensor might also be used instead of the virtual sensor Cp C. A control sequence is comprised between two control changes Tcc1, Tcc2, Tcc3, Tcc4, Tcc5, Tcc6, for example between Tcc1 and Tcc2.

Figure 2:
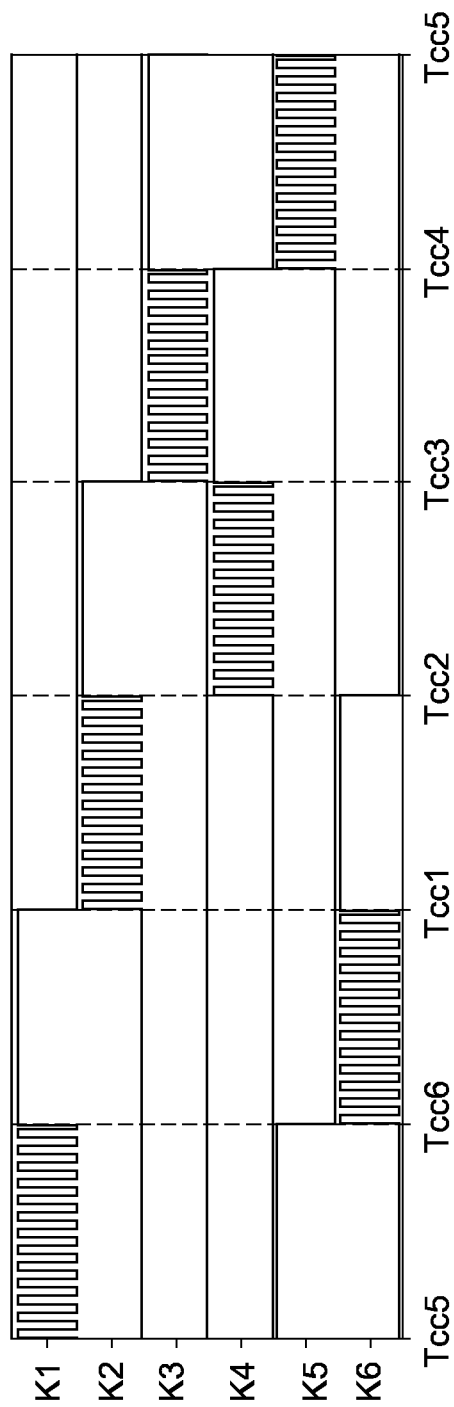
FIG. 2 is a diagram representing the state of the switches of the power module of FIG. 1.

As illustrated in FIG. 2, the driving of two of the switches K1, K2, K3, K4, K5, K6 comprises maintaining a first switch closed while the other one is successively open and closed according to a PWM control (Pulse Width Modulation).

To resume the example of the control sequence defined between Tcc1 and Tcc2, the switch K2 is driven according to a pattern of successive PWM openings and closings and the switch K6 remains closed during the entire control sequence. It is then said that the switch K6 operates in full wave: it is electrically connected throughout the control sequence.

FIG. 3 does not differentiate the control sequences from the switches K1, K2, K3, K4, K5, K6 according to a PWM configuration or a full wave configuration for the purpose of simplifying the figure, although these two configurations are executed according to the diagram of FIG. 2.

FIG. 3 represents the state of the sensors Cp A, Cp B, Cp C which allow determining the position of the rotor. The voltage UB1, UB2, UB3 is also represented at the terminals of each winding B1, B2, B3 and the electromotive force FEM1, FEM2, FEM3 corresponding to each winding B1, B2, B3. It thus appears that after six control sequences Tcc1, Tcc2, Tcc3, Tcc4, Tcc5, Tcc6, the initial state of Tcc1 is found regarding the position of the rotor and the driving of the switches K1, K2, K3, K4, K5, K6.

The digital processing unit Cnu comprises an input provided with an analog-to-digital converter ADC. The input provided with the analog-to-digital converter ADC is arranged to transmit a signal to the processor P from the signal it receives.

Figure 7:
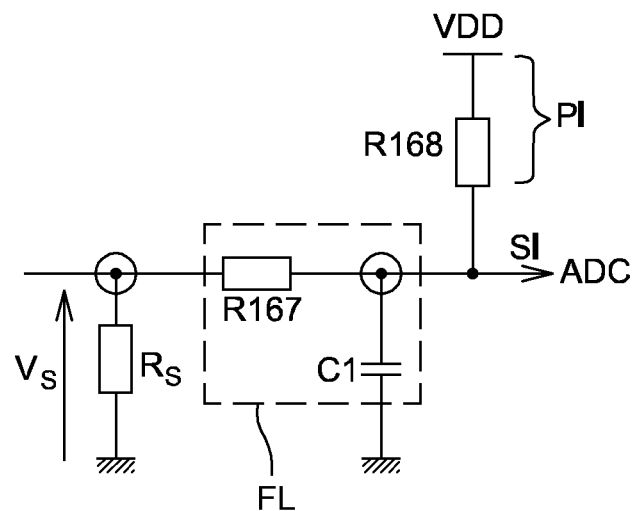
FIG. 7 is an electric diagram of a portion of the actuator of FIG. 1, wherein there is a protection member according to an embodiment of the invention.

The actuator 1 further comprises a signal generator Can provided with a resistor Rs and an analog filter FL, made for example in the form of a low-pass RC circuit, for example constituted by a resistor R167 and a capacitor C1 represented in FIG. 1 and FIG. 7.

The signal generator Can is arranged to deliver an instantaneous signal SI representative of the power supply provided to the motor M, in particular of the current Is, to the input provided with the analog-to-digital converter ADC.

The resistor Rs is disposed between the power module IPM and the ground Gnd. The instantaneous signal SI representative of the power supply provided to the motor M is obtained from the current Is, and following the passage of the current Is in the signal generator Can.

In other words, the voltage Vs and the current Is have the same shape as the instantaneous signal SI. Thus, the input provided with the analog-to-digital converter ADC indirectly reads an instantaneous value of the current Is.

Figure 4:
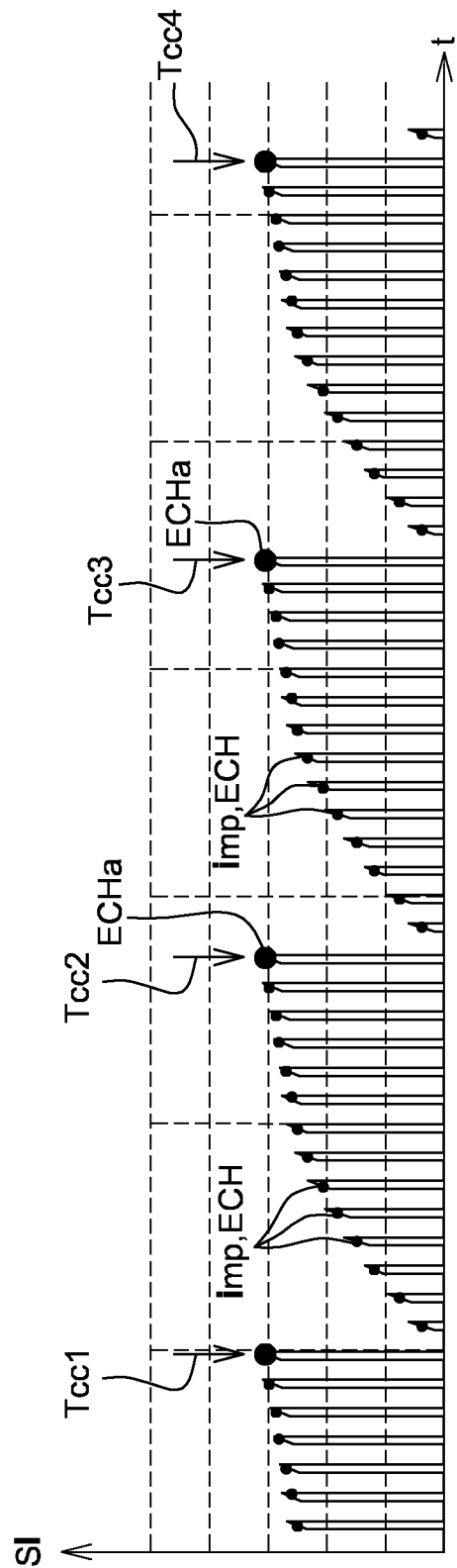
FIG. 4 is a graph of instantaneous signals representative of the power supply provided to the motor of FIG. 1.

FIG. 4 shows the evolution of the instantaneous signal SI as a function of time t. The changes of power supply to the windings B1, B2, B3, or control changes Tcc1, Tcc2, Tcc3, Tcc4, Tcc5, Tcc6 are represented by arrows.

It appears that the pulses imp of the instantaneous signal SI are increasing during the power supply to a same winding B1, B2, B3, in other words during a control sequence. The pulses imp are represented by points.

Figure 5:
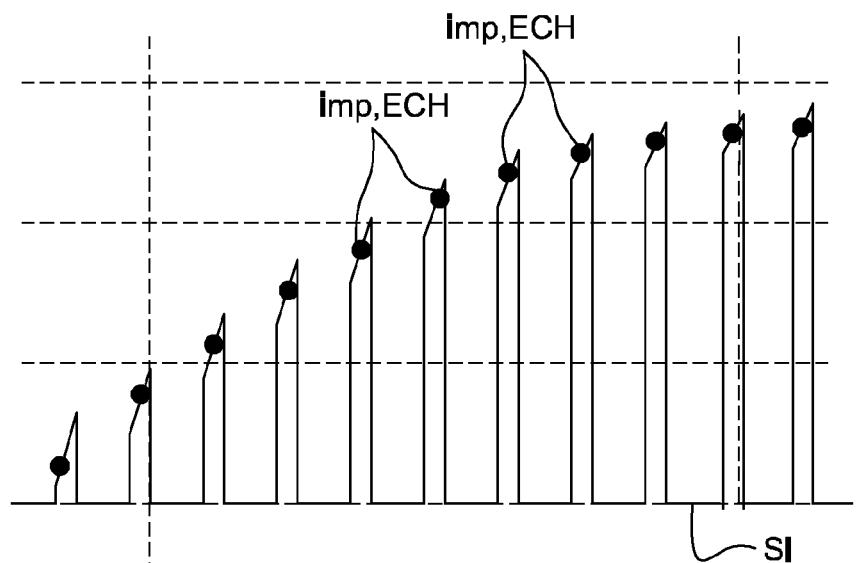
FIG. 5 is a detail view of FIG. 4 reproducing a single control sequence of the motor of FIG. 1.

This phenomenon is explained by the intrinsic features of the windings B1, B2, B3. This phenomenon is also shown in FIG. 5. It also appears in this figure that sampling is carried out in the middle of each pulse imp. This aims to avoid perturbation phenomena of the acquisition due to the switching of the switches K1, K2, K3, K4, K5, K6.

The control sequences may be shifted (delayed or advanced) relative to the sensors Cp A, Cp B according to the driving mode. For example, the sequences of the sensors Cp A, Cp B and of the control of the switches K1, K2, K3, K4, K5, K6 are in phase during the starting sequence then shifted once the motor M is in rotation.

As illustrated in FIGS. 1 and 7, the actuator 1 further comprises a biasing member PI disposed between the input provided with the analog-to-digital converter ADC and the analog filter FL. The biasing member PI is powered by the same voltage source VDD as that of the processor P. The biasing member PI comprises a resistor R168.

FIG. 7 illustrates a specific aspect of the used electronic circuit, which can be implemented independently of the protection arrangements of the actuator 1. In FIG. 7, the structure of a signal generator Can provided with a resistor Rs and an analogue filter FL is found, made for example in the form of a low-pass RC circuit, for example constituted by a resistor R167 and a capacitor C1. The signal generator Can thus constituted is arranged to deliver an instantaneous signal SI representative of the power supply provided to the motor M, and in particular of the current Is, at the input provided with the analog-to-digital converter ADC.

The biasing member PI is arranged to deliver a default input signal when the instantaneous signal SI is not delivered to the input provided with the analog-to-digital converter ADC. Also, in normal operation when the signal generator Can provides a signal, the biasing member PI has no influence on the measurement of the instantaneous signal SI.

When no instantaneous signal SI comes from the analog filter FL, for example in case of an anomaly in operation of the actuator 1, the input provided with the analog-to-digital converter ADC measures a signal depending on the voltage VDD.

Thus, the measurement of the voltage VDD by the input of the analog-to-digital converter ADC corresponds to the detection of an anomaly in operation of the motor M.

According to the example shown, if the circuit is open at the resistor R167, the resistor R168 biases the input of the analog-to-digital converter ADC to the voltage VDD.

A method for controlling and/or protecting the actuator 1, in accordance with an embodiment of the invention will now be described with reference to FIG. 8.

A first step E1 comprises having an instantaneous signal SI representative of the power supply provided to the motor M. In the embodiment shown in FIG. 4, the instantaneous signal SI is an image of the current Is.

A second step E2 comprises carrying out a sampling of values of the instantaneous signal SI. As illustrated in FIG. 4, the sampling represented by the points is synchronized with the pulses imp.

In the embodiment shown in FIG. 4, a sampling is carried out on each pulse imp. According to variants, it would also be possible to carry out a sampling on only one portion of the plurality of pulses imp.

The sampling in the middle of each pulse imp, as shown in FIG. 5, aims to avoid measuring the disturbances of the instantaneous signal SI related to the power switching.

A sampling is a measurement of the value of the instantaneous signal SI carried out at the input of the analog-to-digital converter ADC.

A first control step E3 according to a first protection criterion CRa of the protection actuator 1 comprises carrying out a systematic control of each sampled value ECH. The comparison of the sampled value ECH is compared with the first protection criterion CRa of the actuator 1 before the following conversion.

The sampled values ECH are thus controlled on their receipt at the input provided with the analog-to-digital converter ADC according to a first protection criterion CRa of the actuator 1. Once the control has been carried out, the last value ECH sampled and converted by the analog-to-digital converter ADC is stored until the next conversion of a sampled value ECH.

However, when a sampled value ECH does not comply with the first protection criterion CRa of the actuator 1, the analog-to-digital converter ADC emits a first anomaly piece of information IAa, in particular destined for the processor P.

In other words, as long as no anomaly according to the first protection criterion CRa of the actuator 1 is detected at the input provided with the analog-to-digital converter ADC, no signal related to the verification of compliance with the first protection criterion CRa of the actuator 1 is sent to the processor P. This arrangement allows limiting the use of the resources of the processor P.

The first protection criterion CRa of the actuator 1 comprises comparing each sampled value ECH with a first threshold value VS1, the first anomaly piece of information IAa being emitted when the sampled value ECH is greater than the first threshold value VS1.

The analog-to-digital converter ADC is thus arranged to compare each sampled value ECH with the first threshold value VS1 and to send a first anomaly piece of information IAa when crossing the first threshold value VS1 by the sampled value ECH.

Figure 8:
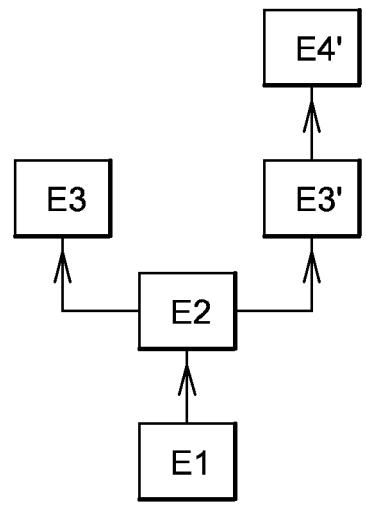
FIG. 8 is a flowchart detailing the steps of a method for controlling and/or protecting the actuator of FIG. 1 in accordance with an embodiment of the invention.

An acquisition step E3' of a set of values ECHa among the sampled values ECH is carried out parallel to the control step E3 according to the first protection criterion CRa of the actuator 1, as illustrated in FIG. 8.

The acquisition step E3' comprises acquiring a set of values ECHa among the sampled values ECH and in determining a representative magnitude GR from said set of acquired sampled values ECHa. This acquisition step E3' is carried out by the processor P.

As illustrated in FIG. 4 by the arrows, the acquisition comprises, for the analog-to-digital converter ADC, in transmitting the last sampled value ECH to the processor P, following the request of the processor P and before the control change Tcc1, Tcc2, Tcc3, Tcc4, Tcc5, Tcc6 represented by an arrow.

Carrying out this acquisition just before the control change Tcc1, Tcc2, Tcc3, Tcc4, Tcc5, Tcc6 allows the processor P to determine more easily the value to be transmitted by the analog-to-digital converter ADC to the processor P.

The sampled and acquired value ECHa just before the control change Tcc1, Tcc2, Tcc3, Tcc4, Tcc5, Tcc6 is a representative value of the motor torque, just like the other sampled values ECH.

However, the first value of a control sequence is difficult to use since it has a low value. For the following sampled values ECH, it would be necessary to determine one to be transmitted to the processor P for processing. Yet, this choice among the sampled values ECH can only be made once the control sequence is complete, the set of the values of the control sequence having been sampled. Additional steps implementing a storage in an additional memory should be provided, because once the control sequence is complete, the values converted by the analog-to-digital converter ADC are overwritten by the following values.

It thus appears that the choice of the last value of the control sequence is judicious. This value of the control sequence is the last converted value just before the control change Tcc1, Tcc2, Tcc3, Tcc4, Tcc5, Tcc6.

In addition, this value is more easily detectable because it has the highest level.

The processor P then proceeds to the determination of the representative magnitude GR from the set of values ECHa among the sampled values ECH. Since the sampled values ECHa are acquired just before the control change Tcc1, Tcc2, Tcc3, Tcc4, Tcc5, Tcc6, the processor P is regularly supplied with acquired sampled values ECHa.

The processor P determines the representative magnitude GR as being the sliding average of the last acquired sampled values ECHa, for example of the last twelve acquired sampled values ECHa.

Thus, the newly sampled acquired values ECHa are added to the set of acquired sampled values ECHa and the oldest acquired sampled values ECHa are progressively eliminated.

A second control step E4' of the representative magnitude GR succeeds the acquisition step E3', as illustrated in FIG. 8. The second control step E4' is carried out by the processor P.

The control step E4' of the representative magnitude GR comprises carrying out a control of said representative magnitude GR according to a second protection criterion CRb of the actuator 1 and in emitting a second anomaly piece of information IAb, in particular destined for the processor P, if the representative magnitude GR does not comply with the second protection criterion CRb of the actuator 1.

The control according to the second protection criterion CRb of the actuator 1 further comprises a comparison of a time evolution ET of the successively determined representative magnitudes GR with a time evolution threshold ETS.

This arrangement allows determining a time evolution ET of the representative magnitude GR faster than the expected evolution. In practice, this evolution may correspond to a sudden increase or a sudden decrease in the current Is having passed through the motor M. In this case, the second emitted anomaly piece of information IAb comprises an indication signaling the exceeding of the time evolution threshold ETS.

The verification of the second protection criterion CRb of the actuator 1 also comprises a comparison of the representative magnitude GR with a second threshold value VS2.

The second anomaly piece of information IAb is also emitted when the representative magnitude GR is greater than the second threshold value VS2. In this case, the second emitted anomaly piece of information IAb comprises an indication signaling the crossing of the second threshold value VS2.

As well as the first threshold value VS1, the second threshold value VS2 varies according to the operating modes of the motor M.

Figure 6:
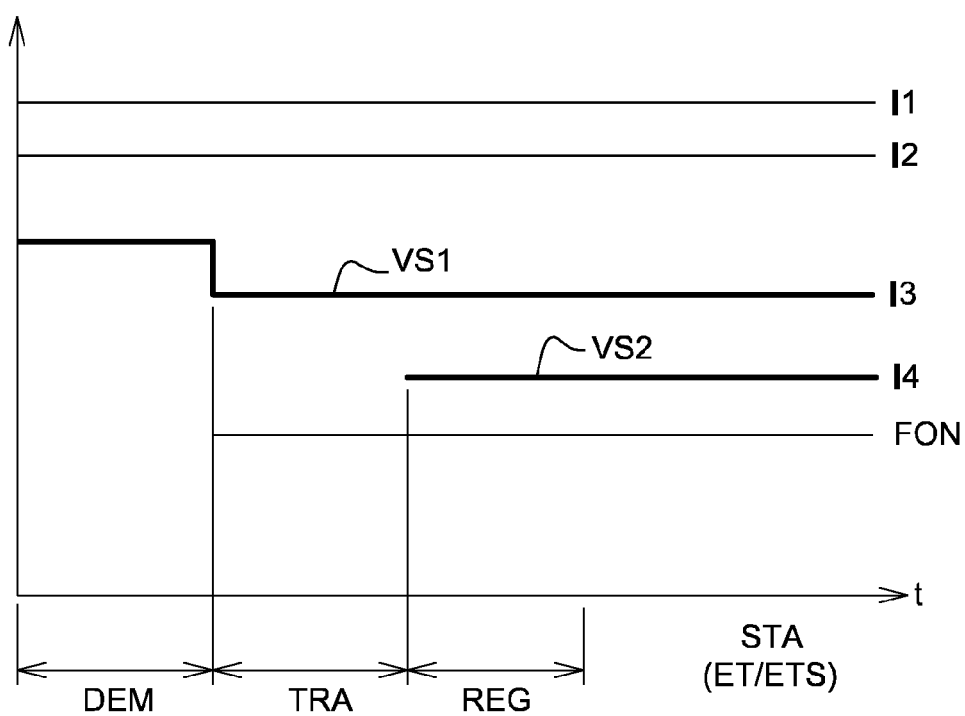
FIG. 6 is a graph representing different protection criteria of the actuator of FIG. 1 according to operating modes of the motor.

FIG. 6 represents different limit intensity values among which the first threshold value VS1 and the second threshold value VS2 are chosen according to the operating mode of the motor M.

In FIG. 6, the operating modes of the motor M are represented as the abscissa in a chronological order since the start of the motor M.

The first operating mode is the starting mode DEM, when the rotational speed of the motor M starts from a zero value then increases up to a determined rotational speed. In the first operating mode, the processor P waits to receive a piece of information of rotational speed called valid, and may optionally add a predetermined time period, which may be for example in the order of 5 ms.

Of course, the predetermined time period added following the receipt of the piece of information of rotational speed is in no way restrictive, and may be different. The addition of this predetermined time period aims to make the software more robust.

The second operating mode is a transition mode TRA, the rotational speed is maintained during this predetermined period TRA, which corresponds in the example shown in two revolutions of the rotor of the motor M. During this transition mode TRA, the rotational speed of the motor M is regulated around a predetermined rotational speed, which may be for example in the order of 1000 revolutions per minute.

The third operating mode is the regulation mode REG, the power supply provided to the motor M is modified, in particular by the processor P, in order to reach a setpoint rotational speed.

The fourth operating mode is the stabilized operating mode STA. This may, for example, begin after a determined period following the start of the third operating mode. In the shown example, the fourth operating mode begins 300 ms after the start of the regulation mode REG. In another example, the fourth operating mode may begin following reaching the setpoint rotational speed.

In FIG. 6, limit intensity values are represented as the ordinate.

A first limit intensity 11 corresponds to a maximum permissible value of the current Is, the maximum permissible value being related to simultaneous conduction phenomena of two switches of a same arm of the power module IPM causing a short circuit of the power supply likely to appear at the level of the switches K1, K2, K3, K4, K5, K6 for supplying electrical energy to windings B1, B2, B3 of the motor M.

A second limit intensity 12 corresponds to a maximum permissible value of the current Is after passage in the motor M that must not be exceeded so that magnets of the rotor are not demagnetized.

A third limit intensity 13 corresponds to a maximum value of the current Is for limiting the instantaneous torque delivered by the actuator 1.

A fourth limit intensity 14 corresponds to a limit average operating intensity beyond which the torque of the motor M is greater than the maximum torque permissible by the mechanical members of the actuator 1.

The processor P defines the first threshold value VS1 as being the lowest of the first three limit intensities 11, 12, 13. In the example shown in FIG. 6, the first threshold value VS1 is therefore the third limit intensity 13, which corresponds to the thick line portions in FIG. 6.

The second threshold value VS2 is defined as being the lowest limit intensity, that is to say 14. Thus, during the regulation mode REG and the stabilized operating mode STA, the second threshold value VS2 is equal to the fourth limit intensity 14.

Thus, it appears in the shown example that the first threshold value VS1 is greater than the second threshold value VS2 and that crossing or exceeding the second threshold value VS2 is taken into account only from the regulation mode REG.

However, the first threshold value VS1 and the second threshold value VS2 are customizable data of the processor P. They could be equal, or the second threshold value VS2 might be greater than the first threshold value VS1.

In addition, in the case of an actuator 1 having, in particular, a function for detecting end-of-travel stops, during the stabilized operating mode, the processor P is arranged to control the time evolution ET of the representative magnitude GR in order to achieve the detection of the ends of travel of the actuator 1. It should be noted that the protection stops the motor M before the rotor is blocked.

The ends of travel of the actuator 1 correspond to the stops aiming to signal either the open position of the apron of the roller shutter or the closed position of the apron of the roller shutter.

In the case of an actuator of a type having a counting function, in particular by the detection of the ends of travel not being defined by physical stops, it is possible for a user to define an adjustment of the end-of-travel positions, the actuator being arranged to stop at the end-of-travel positions thus defined.

A functional limitation intensity FON of the couple is thus represented. This value is used by the system for regulating the rotational speed of the motor M. When this intensity FON is reached, the processor P is arranged to decrease the rotational speed. In reaction, the current Is is likely to change. However, if there is an anomaly or a dysfunction in the motor M, the current Is does not necessarily decrease with the rotational speed of the motor M. The processor P then detects an exceeding of the second threshold value VS2 in the regulation mode REG or in the stabilized operating mode STA.

FIGS. 9 to 12 show an example illustrating a method for determining the use of the first and second protection criteria CRa, CRb of the actuator 1 during the implementation of the control and/or protection method.

Figure 9:
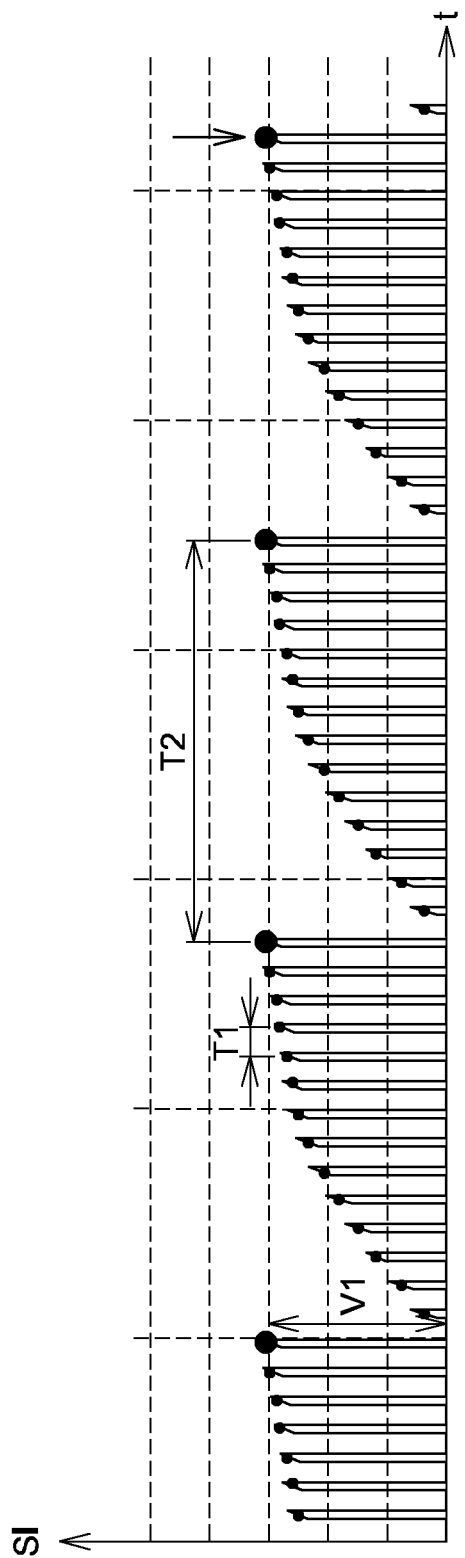
FIGS. 9 to 12 are graphics representing a method for determining the use of the first and second protection criteria of the actuator during the implementation of the control and/or protection method of FIG. 6.

In FIG. 9, the voltage Vs as well as magnitudes GR likely of being measured are represented, namely the voltage V1 of the largest pulse, a period T1 between two pulses imp and a period T2 between two of the control changes Tcc1, Tcc2, Tcc3, Tcc4, Tcc5, Tcc6.

Figure 10:
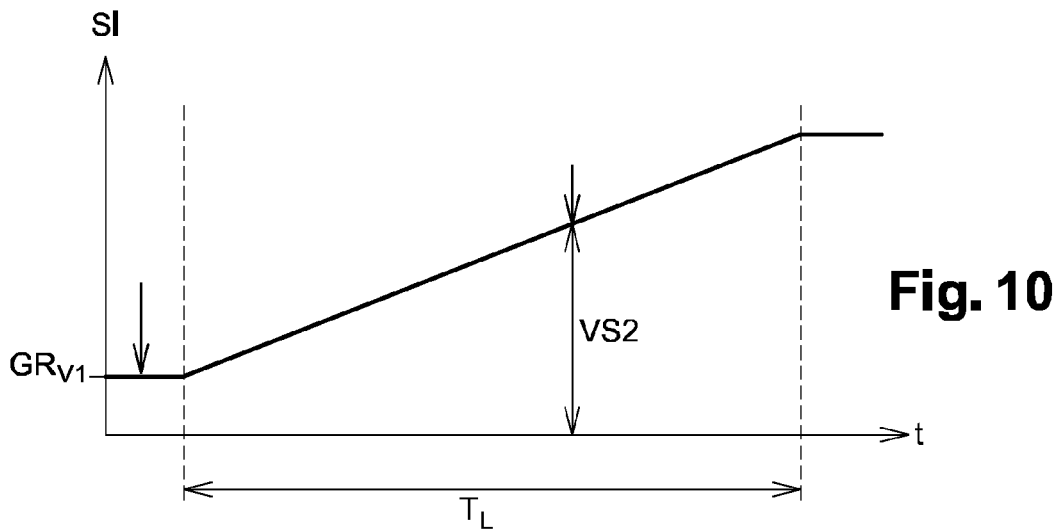

In FIG. 10, the evolution of the representative magnitude $GR_{V1}$ of the voltage V1 is represented over a long period $T_L$ in the order of 10 seconds. It is possible to measure a value of the protection at the shut-off of the motor M. By making sure that this measurement has been carried out after a quite long time, it is known that the stabilized operating mode STA has been reached. If the shut-off occurs during the period $T_L$, the measured value thus corresponds to the second threshold value VS2 and consequently to the control of the second protection criterion CRb of the actuator 1.

Figure 11:
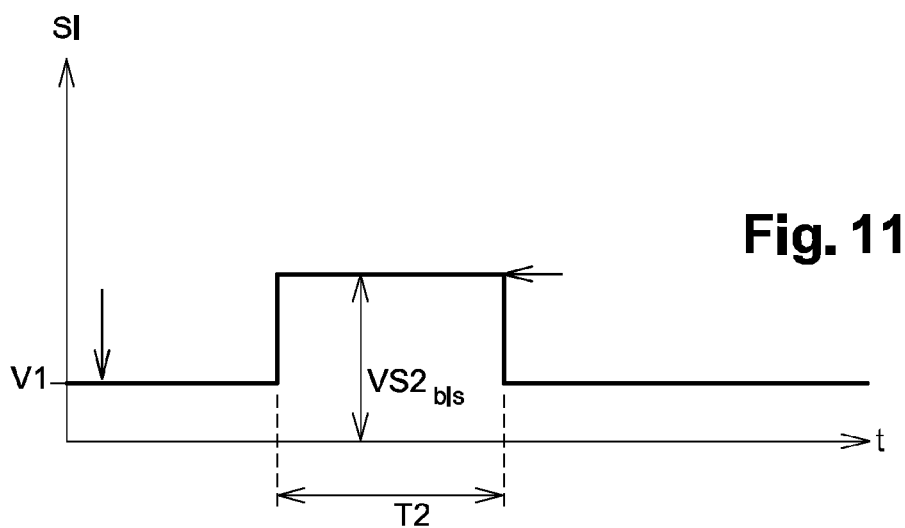
Figure 12:
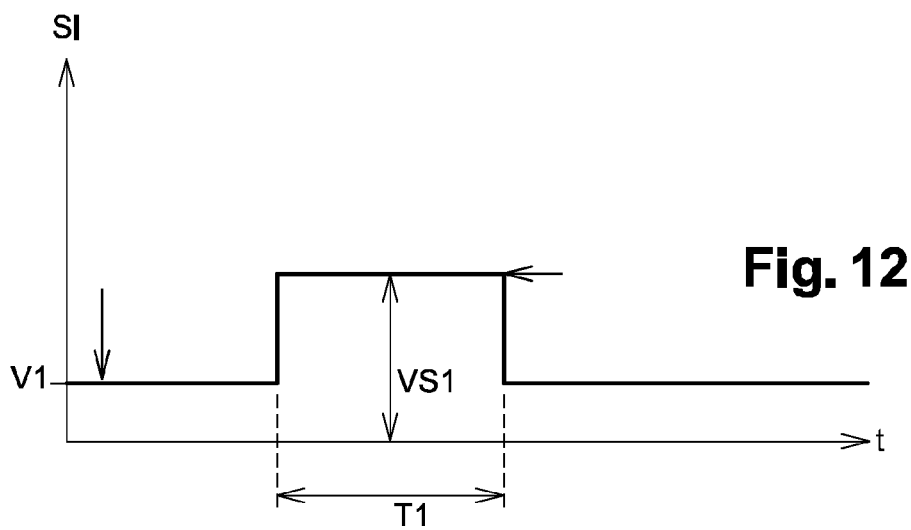

FIGS. 11 and 12 show the sudden appearance of two operating anomalies having the impact of increasing the value of the voltage V1.

As illustrated in FIG. 12, if the shut-off occurs during the period T1 corresponding to the interval between two pulses imp, the shut-off voltage corresponds to the first threshold value VS1, and consequently to the control of the first protection criterion CRa of the actuator 1.

Furthermore, as illustrated in FIG. 11, if the shut-off of the motor occurs during the time period T2 corresponding to the duration between two of the control changes Tcc1, Tcc2, Tcc3, Tcc4, Tcc5, Tcc6, it is the exceeding of another second threshold value VS2bis, and consequently to the control of the second protection criterion CRb of the actuator 1. The other second threshold value VS2bis may be different from the value of the second threshold value VS2, because an instantaneous value between two of the control changes Tcc1, Tcc2, Tcc3, Tcc4, Tcc5, Tcc6 is controlled and unlike the representative magnitude $GR_{V1}$.

From this example, it can be seen that it is possible to measure the first threshold value VS1 and the second threshold value VS2, and also another second threshold value VS2bis.

It would also be possible to measure the crossing of the time evolution threshold ETS according to the second protection criterion CRb of the actuator 1 by applying to the analog-to-digital converter ADC several voltage ramps whose maximum value does not exceed the second threshold value VS2.

The measurements previously carried out allow detecting the lowest limit intensity for each protection criterion CRa, CRb of the actuator 1.

As it is obvious, the invention is not limited to the only embodiment of this control and/or protection method of a motor, described above by way of example, it embraces, on the contrary, all the variants.

The invention claimed is:

1. A method for controlling and/or protecting an actuator of a mobile equipment of a building, the actuator comprising a motor comprising a rotor and a stator, the method comprising:
having an instantaneous signal representative of the power supply provided to the motor, the instantaneous signal having a plurality of pulses,
carrying out a sampling of values of the instantaneous signal, the sampling being synchronized with at least one portion of the pulses of the plurality of pulses of the instantaneous signal,
carrying out a control of each sampled value according to a first protection criterion of the actuator, and emitting a first anomaly piece of information for each sampled value not complying with the first protection criterion,
acquiring a set of values from the sampled values,
carrying out a control according to a second protection criterion of the actuator applied to the set of acquired sampled values, and emitting a second anomaly piece of information for the set of acquired sampled values not complying with the second protection criterion.

2. The control and/or protection method according to claim 1, wherein the motor has at least one first operating mode, and a second operating mode, and wherein the first protection criterion and/or the second protection criterion of the actuator is modified according to the operating mode of the motor.

3. The control and/or protection method according to claim 1, wherein a representative magnitude from said set of acquired sampled values is determined, and the second protection criterion of the actuator is applied to said representative magnitude.

4. The control and/or protection method according to claim 3, wherein, in the step for acquiring and determining the representative magnitude, an acquired sampled value subsequently to the acquired sampled values is added to the set of acquired sampled values, the representative magnitude being determined again following the addition of the subsequently acquired sampled value.

5. The control and/or protection method according to claim 4, wherein during the addition of the subsequently acquired sampled value, the oldest acquired sampled value is deleted from the set of the acquired sampled values.

6. The control and/or protection method according to claim 4, wherein, the control according to the second protection criterion of the actuator further comprises a comparison of a time evolution of the successively determined representative magnitudes with a time evolution threshold.

7. The control and/or protection method according to claim 1, wherein, the control according to the first protection criterion of the actuator comprises a comparison of each sampled value with a first threshold value.

8. The control and/or protection method according to claim 7, wherein the control according to the second protection criterion of the actuator comprises a comparison of the representative magnitude with a second threshold value.

9. A computer program product comprising code instructions arranged to implement the steps of a control and/or protection method according to claim 1, when said program is executed on a processor of a control and/or protection unit.

10. The control and/or protection unit provided with a processor comprising in memory the code instructions of a computer program product according to claim 9, the control and/or protection unit being arranged to read an instantaneous signal representative of the power supply provided to a motor comprising a rotor and a stator.

11. The control and/or protection unit according to claim 10, further comprising a signal generator arranged to deliver an instantaneous signal representative of the power supply provided to the motor, and a biasing member arranged to establish a default input signal instead of the instantaneous signal when the signal generator has a defect generating the absence of signal.

12. The control and/or protection unit according to claim 10, comprising a digital processing unit, the digital processing unit comprising the processor and an analog-to-digital converter arranged to read and convert the instantaneous signal representative of the power supply provided to the motor into a digital signal interpretable by the processor.

13. An actuator of a mobile equipment of a building comprising:
- a motor comprising a rotor and a stator,
- a power module arranged to provide a power supply to the motor,
- a control and/or protection unit according to claim 10, arranged to read an instantaneous signal representative of the power supply provided to the motor.

\* \* \* \* \*